Patented Oct. 16, 1945

2,386,934

UNITED STATES PATENT OFFICE 2,386,934

ISOMERIZATION OF OLEFINS

Paul L. Cramer, Highland Park, Mich., assignor to General Motors Corporation, Detroit, Mich., a corporation of Delaware No Drawing. Application July 28, 1943, Serial No. 496,474

6 Claims. (Cl. 260—683.2)

This invention relates generally to the isomerization of olefins and more particularly to the isomerization of branched-chain olefins.

The isomerization of olefins has been heretofore carried out by means of a variety of catalysts. The most effective catalysts, such as sulphuric acid, phosphoric acid, or certain salts of these acids, give in most instances undesirable side reaction products. These side reaction products, polymers or oxidized material, cause a marked decrease in the activity of the catalyst.

I have discovered that concentrated aqueous hydrochloric acid may act as a true catalyst for the isomerization of certain olefins. This is brought about by heating small amounts of the concentrated acid with the olefin for comparatively long contact times. The reaction includes only branched-chain olefins having the double bond adjacent to the branch and involves a shift in the double bond as may be illustrated by the following typical reaction:

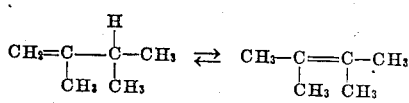

The above equilibrium is determined by reaction temperature and may be approached from either side.

The reaction is preferably carried out in the liquid phase at reaction temperatures on the order of 100° to 200° C. or somewhat higher temperature by either static or flow methods. The reaction pressure is determined by the vapor pressure of the olefin at any particular temperature.

Concentrated aqueous HCl containing 20% to 37% HCl may be used, the higher concentration of acid being preferred. The molar concentrations of the reactants may vary considerably. For example the following limits may be used:

Olefin, 93 mole percent
Acid on basis of HCl, 7 mole percent
to
Olefin, 80 mole percent
Acid on basis of HCl 20 mole percent Higher molar concentrations of the acid increase the reaction rate but give greatly increased amounts of alkyl chlorides as side reaction products. At lower molar concentrations of acid, much longer contact times are required to reach equilibrium for the isomerization reaction. The preferred molar concentrations are olefin 89% and HCl 11%.

The following may be given as typical examples of specific procedure:

Example 1

2,3-dimethylbutene-1 and concentrated hydrochloric acid (37%) in the volume ratio of 100 parts of olefin to 8.5 parts acid were heated in a closed glass container for three hours. After cooling the reaction mixture, the aqueous acid layer was separated and the reaction products washed and dried. As analyzed by fractionation, 75% of the 2,3-dimethylbutene-1 was isomerized to 2,3-dimethylbutene-2. About 2% of 2-chloro-2,3-dimethylbutene was formed as a side reaction product.

Example 2

2-methylbutene-1 and concentrated hydrochloric acid (37%) in the volume ratio of 100 parts of the olefin and eight parts acid were heated in a closed glass container for three hours at 150° C. As analyzed by fractionation, 70% of 2-methylbutene-1 was isomerized to 2-methylbutene-2. A very small amount of alkyl halides (between one and two per cent), was formed as a side reaction product.

The following table summarizes certain results obtained in isomerizing 2,3-dimethylbutene-1 to 2,3-dimethylbutene-2 by use of aqueous hydrochloric acid as a catalyst. In this reaction the preferred reaction temperature and time are 150° C. and 3 hours respectively:

*Isomerization of 2,3-dimethylbutene-1 to 2,3-dimethylbutene-2 by the use of aqueous hydrochloric acid as a catalyst*

| 2,3-dimethyl-butene-1, parts by volume | Aqueous HCl | | Mole percent concentration | | Reaction temp., °C. | Reaction time, hrs. | Reaction products | | Isomerization, percent |
|---|---|---|---|---|---|---|---|---|---|
| | Parts by volume | Percent | Olefin | HCl | | | Alkyl halide, percent | Olefin, percent | |
| 61.5 | 5 | 37 | 90 | 10 | 150 | 3 | 2 | 98 | 70 |
| 100 | 5 | 37 | 93 | 7 | 150 | 3 | 1 | 99 | 23 |
| 100 | 8.5 | 37 | 89 | 11 | 150 | 3 | 2 | 98 | 75 |
| 61.5 | 1 | 37 | 98 | 2 | 150 | 3 | Trace | 100— | 10 |
| 100 | 18 | 20 | 89 | 11 | 150 | 3 | 2 | 98 | 56 |
| 100 | 8.5 | 37 | 89 | 11 | 150 | 1 | 2 | 98 | 17 |
| 100 | 8.5 | 37 | 89 | 11 | 100 | 3 | 2 | 98 | 65 |
| 100 | 8.5 | 37 | 89 | 11 | 200 | 2 | 2 | 98 | 65 |
| 61.5 | 5 | 37 | 90 | 10 | 150 | 2 | 2 | 98 | 45 |

Other branched-chain olefins having the double bond adjacent the branch may be treated in a manner similar to that of the procedure in the examples above.

Various changes and modifications may be made without departing from the principles of my invention and I do not intend to limit the patent granted for my invention.

I claim:

1. A process of isomerizing a branched-chain olefin having the double bond adjacent to the branch which includes providing a mixture of the branched-chain olefin and concentrated aqueous hydrochloric acid having a concentration ranging from 20% to 37%, said olefin being from 80 to 93 mole per cent and the hydrochloric acid being from 7 to 20 mole per cent, and heating the mixture of the acid and the branched-chain olefin at a temperature on the order of 100° to 200° C. for at least about one hour.

2. A process of isomerizing a branched-chain olefin having the double bond adjacent to the branch which includes mixing the branched-chain olefin with concentrated aqueous hydrochloric acid having a concentration ranging from 20% to 37%, said branched-chain olefin being 80 to 93 mole per cent and the hydrochloric acid being from 7 to 20 mole per cent of the mixture, and heating the mixture of the branched-chain olefin and the acid at a temperature on the order of 100° to 200° C. for a time between one and three hours.

3. A process as in claim 2 in which the branched-chain olefin is 2,3-dimethylbutene-1.

4. A process as in claim 2 in which the branched-chain olefin is 2-methylbutene-1.

5. A process of isomerizing 2,3-dimethylbutene-1 to 2,3-dimethylbutene-2 which includes providing a mixture of 2,3-dimethylbutene-1 and concentrated aqueous hydrochloric acid having a concentration of 37% in the volume ratio of 100 to 8.5, and heating said mixture at a temperature of 150° C. for about three hours.

6. A process of isomerizing 2-methylbutene-1 to 2-methylbutene-2 which includes providing a mixture of 2-methylbutene-1 and concentrated aqueous hydrochloric acid having a concentration of 37% in the volume ratio of 100 parts olefin to 8 parts acid, and heating the mixture at 150° C. for about three hours.

PAUL L. CRAMER.